UNITED STATES PATENT OFFICE.

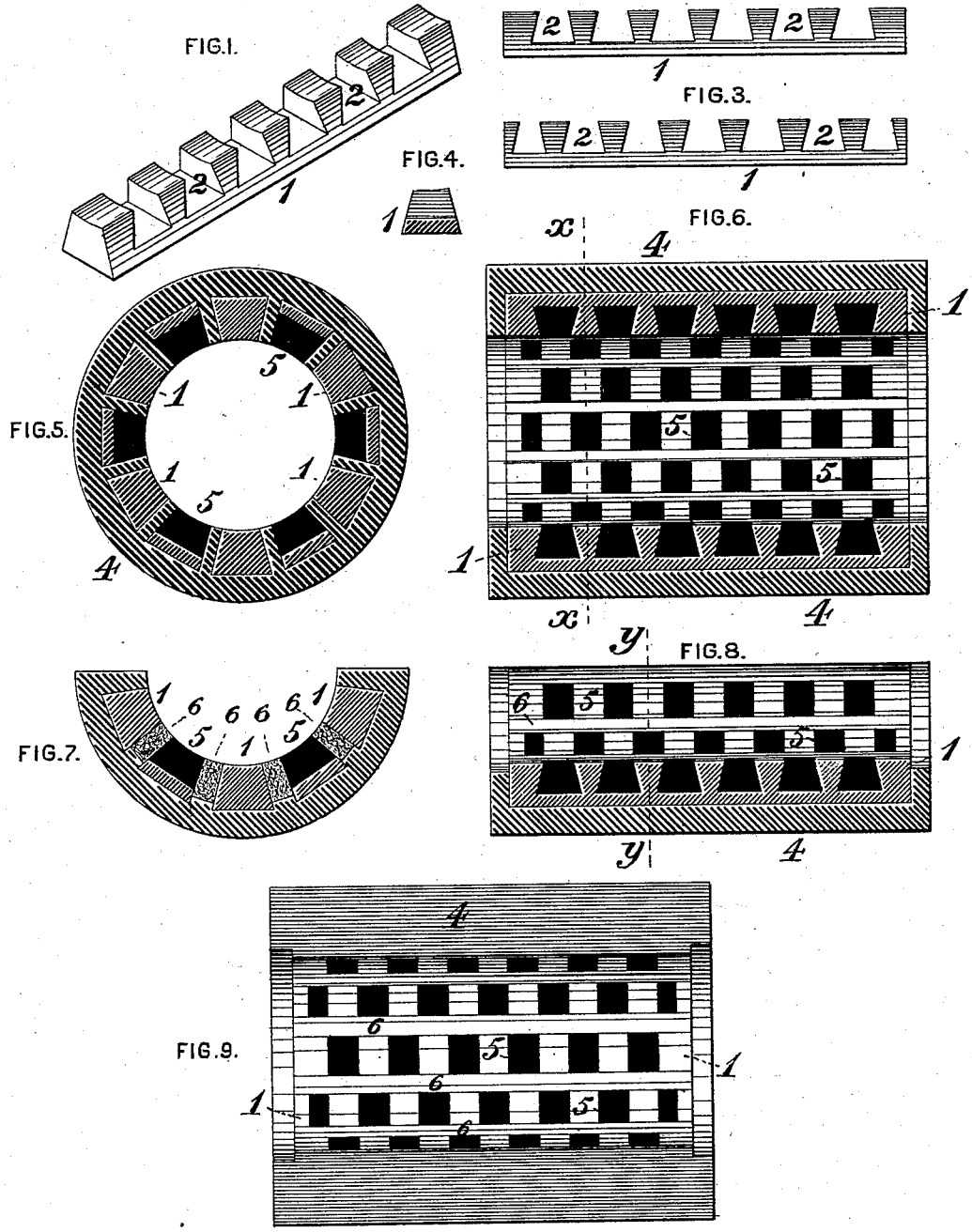

CHARLES RICHARDS, OF CLEVELAND, OHIO.

ANTI-FRICTION BEARING.

SPECIFICATION forming part of Letters Patent No. 307,335, dated October 28, 1884.

Application filed April 10, 1884. (No model.)

*To all whom it may concern:*

Be it known that I, CHARLES RICHARDS, a citizen of the United States, residing at Cleveland, in the county of Cuyahoga and State of Ohio, have invented or discovered certain new and useful Improvements in Anti-Friction Bearings, of which improvements the following is a specification.

In the accompanying drawings, which make part of this specification, Figure 1 is a view in perspective of a bearing-strip embodying my invention; Figs. 2 and 3, side views in elevation of bearing-strips having their recesses alternated in position, respectively; Fig. 4, a transverse section of a bearing-strip; Fig. 5, a transverse section, at the line $x\ x$ of Fig. 6, through a continuous bearing or bushing having a series of bearing-strips similar to those shown in Figs. 1 to 4; Fig. 6, an axial section through the same; Fig. 7, a transverse section, at the line $y\ y$ of Fig. 8, through a segmental bearing or bushing having similar strips; Fig. 8, an axial section, and Fig. 9 a plan view of the same.

In an application for Letters Patent filed by me under date of December 10, 1883, Serial No. 114,783, I have shown and described a bearing or bushing in which a series of bearing-plates recessed on their bearing-surfaces are combined with a casing, by which they are inclosed and united.

My invention, as herein set forth, is designed to enable plain metallic surfaces, or surfaces of metal or alloy softer than that of bearing-plates, containing a filling of lubricating material, to be conveniently applied in desired relation to plates of such character in a bearing or bushing.

To this end my improvement consists in the combination of two or more metallic bearing-strips, each having a bearing-surface which is straight longitudinally, and a series of open-sided recesses or slots formed transversely in said face, a filling of lubricating material inserted in the recesses of said strips, and an inclosing-casing uniting said bearing-strips and interposed laterally between the same; also, in the combination of two or more bearing-strips, as specified, a filling of lubricating material inserted in the recesses thereof, an inclosing-casing, and a facing of soft metal or alloy cast in the casing and between the bearing-strips.

The improvements claimed are hereinafter more fully set forth.

To carry out my invention I form of any suitable metal of sufficient strength and hardness to constitute the bearing or support of a moving member in a mechanical structure a straight bearing-strip, 1—that is to say, a strip having a bearing-face which coincides in any longitudinal plane of section with a straight line, and which may be transversely either straight or, as shown, curved in conformity with the periphery of a shaft, stem, or journal with which it is designed to be in contact when in use. A series of transverse recesses or slots, 2, is formed in the bearing-strip 1, said recesses extending from the bearing-surface toward the opposite face of the strip and entirely across the same, thereby presenting a clear opening on three sides—to wit, the bearing-surface and the two sides of the strip.

The recesses 2, which are designed to receive a filling of solid lubricating material in a compressed condition—as, for example, graphite—may be of any desired form and number, being preferably beveled or tapered inwardly, as shown, in order to more firmly retain the filling placed therein, and the insertion and compression to any desired degree of the lubricant in the recesses can be readily and perfectly accomplished, as the recesses are open and unobstructed on their tops and sides.

The bearing-strips shown in Figs. 2 and 3 differ only in the relative location of their recesses, those of one strip being longitudinally opposite solid portions of the other.

In the construction of bearings or bushings two or more bearing-strips as above described, having their recesses filled with lubricating material, 5, (shown in solid black in the drawings,) are arranged parallel with one another and at desired distances apart, and with their bearing-surfaces either in a plane, if straight transversely, or located radially to a common axis, if curved, and a casing, 4, of metal, is cast around them in a suitable mold, said casing inclosing the bearing-strips on their ends and outer faces, and also on their sides, either completely up to their bearing-surfaces, as in Figs. 4 and 5, or for a portion only of their height, as in Figs. 6 and 7. The bearing-strips are preferably arranged, as shown, so that the recesses and solid portions shall be alternated in position transversely to the bearing, and where the metal of the casing is not carried up to the bearing-surface the longitudinal spaces between the strips are filled by casting therein a facing, 6, of Babbitt or other suitable soft alloy or metal, the same occupying the area of bearing-surface between the bearing-strips. The latter are thus in either case separated by longitudinal faces of metal unprovided with lubricant, which faces may be of greater or less width proportionately to the quantity of lubricant which it is desired to present upon the bearing-surface.

I disclaim, broadly, a graphite filling for bearings, and also a frame containing softer material, in combination with a journal-bearing.

I claim herein as my invention—

1. The combination, in a bearing or bushing, of two or more metallic bearing-strips, each having a series of open-sided recesses in a bearing-surface which is straight longitudinally, a filling of lubricating material inserted in said recesses, and an inclosing-casing uniting said bearing-strips and interposed laterally between the same, substantially as set forth.

2. The combination, in a bearing or bushing, of two or more metallic bearing-strips, each having a series of open-sided recesses in a bearing-surface which is straight longitudinally, a filling of lubricating material inserted in said recesses, an inclosing-casing uniting said bearing-strips, and a facing of soft metal or alloy cast in the casing in the spaces between the bearing-strips, substantially as set forth.

In testimony whereof I have hereunto set my hand.

CHARLES RICHARDS.

Witnesses:
J. SNOWDEN BELL,
R. H. WHITTLESEY.